(12) United States Patent
Pursell

(10) Patent No.: US 7,726,023 B2
(45) Date of Patent: Jun. 1, 2010

(54) METHOD OF MAKING METAL COMPONENTS

(75) Inventor: John Gareth Pursell, Bristol (GB)

(73) Assignee: Rolls-Royce PLC, London (GB)

( * ) Notice: Subject to any disclaimer, the term of this patent is extended or adjusted under 35 U.S.C. 154(b) by 1021 days.

(21) Appl. No.: 11/452,981

(22) Filed: Jun. 15, 2006

(65) Prior Publication Data

US 2007/0020134 A1 Jan. 25, 2007

(30) Foreign Application Priority Data

Jul. 23, 2005 (GB) .................. 0515211.1

(51) Int. Cl.
*B21D 39/00* (2006.01)
*B21K 25/00* (2006.01)
*B22F 1/02* (2006.01)
*B22F 7/00* (2006.01)
*B23K 20/00* (2006.01)
*B23P 17/00* (2006.01)

(52) U.S. Cl. .................. 29/889.23; 29/423; 29/889.7; 29/889.71; 228/165; 228/169; 228/173.2; 228/193; 419/5; 419/6; 419/7; 419/8; 419/38; 428/570

(58) Field of Classification Search .................. 29/423, 29/458, 527.1, 527.2, 889.23, 889.7, 889.71; 228/165, 169, 173.2, 193, 246; 419/5–9, 419/38; 428/570, 615
See application file for complete search history.

(56) References Cited

U.S. PATENT DOCUMENTS

| 2,922,721 | A | * | 1/1960 | Tarkan et al. ............... 427/180 |
| 4,568,516 | A | * | 2/1986 | Adlerborn et al. ........... 264/604 |
| 5,470,524 | A | | 11/1995 | Krueger et al. |
| 5,562,245 | A | | 10/1996 | Berthelemy et al. |
| 5,946,801 | A | | 9/1999 | Twigg et al. |

* cited by examiner

*Primary Examiner*—David P Bryant
*Assistant Examiner*—Alexander P Taousakis
(74) *Attorney, Agent, or Firm*—Oliff & Berridge, PLC

(57) ABSTRACT

In order to create titanium components with a titanium composite insert, a method is provided whereby an initial pre form 1 has a groove 2 formed in it. An encapsulating member 4 is then provided about the groove 2 in order to create a cavity 5 which is filled with titanium alloy powder 6. This titanium alloy powder 6 is densified and then accurately machined in order to create a groove insert form 7 which can accommodate a titanium composite material pre form insert 8 and further titanium alloy powder 9 such that through a high temperature isostatic pressing (HIP) process, the insert 8 is embedded. The original component form 1 can then be machined in order to create the final component elements such as aerofoils 13.

13 Claims, 3 Drawing Sheets

METHOD OF MAKING METAL COMPONENTS

The present invention relates to a method of making metal components and such components including rotors with machined aerofoils, particularly formed from titanium and titanium alloys.

It will be appreciated that forming of titanium components in order to achieve components which have sufficient robustness and have mechanical capabilities to meet particular operational requirements has been achieved previously. In particular, U.S. Pat. No. 5,946,801 and U.S. Pat. No. 5,470,524 describe previous methods for forming titanium blade components. It will be understood that there is a balance between convenience of manufacture, achievement of the necessary mechanical capabilities and cost.

Previous methods have described the use of a substantial forging to ensure the accurate positioning and shape of a composite ring within a finely machined structure used to form the blade component. The forging itself is expensive and the consolidated part requires a large amount of machining in order to produce a final component. U.S. Pat. No. 5,470,524 describes the consolidation of rings of composite material and powder within a capsule to produce a component which approaches the desired final shape of the finished component. However, such an approach allows an unacceptable level of freedom of movement of the composite material within the capsule during processing such that this approach has limited practical application.

Ideally there should be a relatively rigid annular disc which ensures dimensional accuracy of the composite ring formed by the process.

In accordance with the present invention there is provided a method of forming a metal component, the method comprising forming a metal pre form with a groove for consolidation of a potentially consolidatible composite material, the method characterised by encapsulating the pre form with a groove encapsulating form to define a cavity between the metal pre form and the groove encapsulating form, filling the cavity with a metal powder, densifying the metal powder to replicate the cavity as a cavity insert form, shaping the cavity insert form to a groove insert form, filling the groove insert form with an unconsolidated composite material and metal powder, consolidating and densifying the metal powder and/or the unconsolidated composite material with the metal powder cavity insert form to form a unitary structure integral with the metal pre form and forming to a final component shape.

Normally, the composite material is a titanium composite material and the metal powder is a titanium alloy powder.

Preferably, the unconsolidated composite material and the metal powder are located within a circumferentially extending groove in the groove insert form. Generally, the metal pre form is machined from one side to form a circumferentially extending groove.

Generally, the groove encapsulating form is placed in order that it surrounds the metal pre form to define the cavity. Normally, the groove encapsulating form is a mild steel coat to the metal pre form about the groove.

Generally, the metal powder in the cavity is densified to a solid state by hot isostatic pressing (HIP) of the metal powder after evacuation and off gassing at high temperature.

Generally, the unconsolidated composite material is provided by locating at least one ceramic fibre and at least one alloy wire or alloy powder and/or at least one circumferentially extending ceramic fibre coated with an alloy or a combination of these parts.

Typically, the unconsolidated composite material and the alloy powder in the metal powder cavity insert form are densified and consolidated by a hot isostatic pressing (HIP) process after evacuation and degassing.

Normally, the forming to final component shape forms elements of the final component and these elements extend from the metal pre form. Typically, the elements are aerofoils or coupling recesses or projections for securing other components.

Possibly, the metal powder filling the cavity between the groove in the metal pre form and the groove encapsulating form and the metal powder filling the groove in the groove insert form are the same and are different to the metal pre form.

Additionally, the metal pre form may comprise a sandwich structure with different metal alloys.

Embodiments of the present invention will now be described by way of example and with reference to the accompanying drawings in which.

The present invention eliminates the need for substantial forging of material of the quality necessary in the final component, such as a compressor disc or fan disc of a gas turbine engine. An annular disc of titanium is used in the process for producing a gas turbine engine disc. This annular disc of titanium is used to provide rigidity and to ensure dimensional accuracy of the composite engine ring, but does not become part of the final ring structure. In such circumstances a lower grade of titanium material may be utilised for the root leading to significant cost reductions with respect to the manufacture of the engine ring. For example, the material used to provide the composite ring may be a slice of as cast, double vacuum melted titanium ingot whereas rotor grade material will have been more repeatedly melted and forged in order to achieve a more tightly controlled chemical composition. Such repeated melting and forging adds significantly to costs for that material.

By the present invention it is also possible to produce composite rings encased in materials which cannot be obtained by a forging process. For example, mechanically alloyed powders may be used to obtain novel alloys, or a fine powder may be used to produce a material having exceptional homogenality and consistency of properties. The powder may be of material which is tailored for the particular properties required of the mounting ring or hoop for the engine disc, whilst the blades or blade retaining features may be of a different alloy with different properties more suited to these operational requirements. For example, the blade elements projecting from the mounting ring may be of a non burning titanium material or the blade retaining features may be of a material having a high creep resistance whilst the hoop material may be softer allowing stresses in the material to relax. In such circumstances there will be greater fatigue resistance and damage tolerance in the mounting bore or hoop of the disc. It will be possible by the present invention to provide a component which has tailored properties in specific regions to optimise the strength of the component in those regions for incident operational requirements.

The present method and component form is essentially directed to titanium components. As indicated above, it is known from U.S. Pat. No. 5,946,801 and U.S. Pat. No. 5,470,524 to provide methods of making rotors for turbo machinery such as gas turbine engines. The present method allows more convenient provision of composite rotor components, for example in titanium. FIGS. 1 to 8 illustrate the basic essential steps of the present method in order to create a titanium component.

Figure 1:
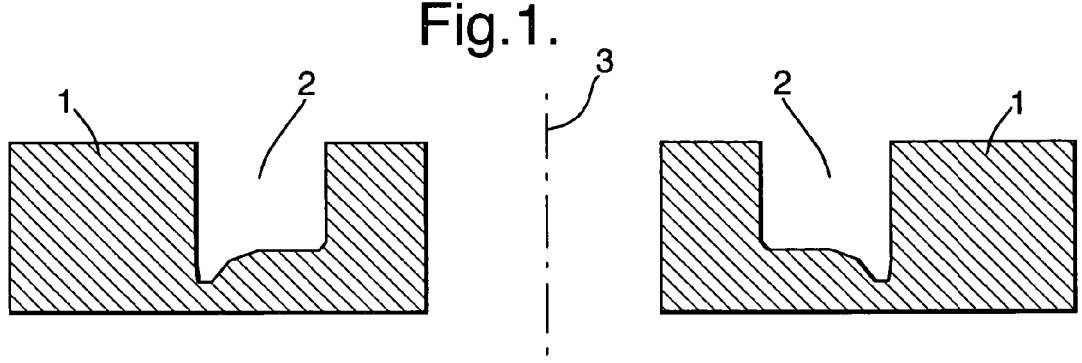
FIG. 1 is a schematic cross section illustrating a disc in accordance with the present invention with a machined groove.

In FIG. 1, a cross section of a titanium annular disc 1 is illustrated in which a circumferentially extending groove 2 has been machined. It would be appreciated that the disc is circular about a centre line 3. The titanium annular disc 1 is generally formed from material from which the eventual component will be formed in the sense that this material will provide the rotor elements or mounting elements, etc for rotors or other operational features in a component. Thus, the material will be of a sufficient grade to meet those particular objectives. Machining of the groove 2 will be achieved in accordance with usual practices, and as shown in FIG. 1, will generally be circumferential about the disc 1 extending from one side of that disc 1.

Figure 9:
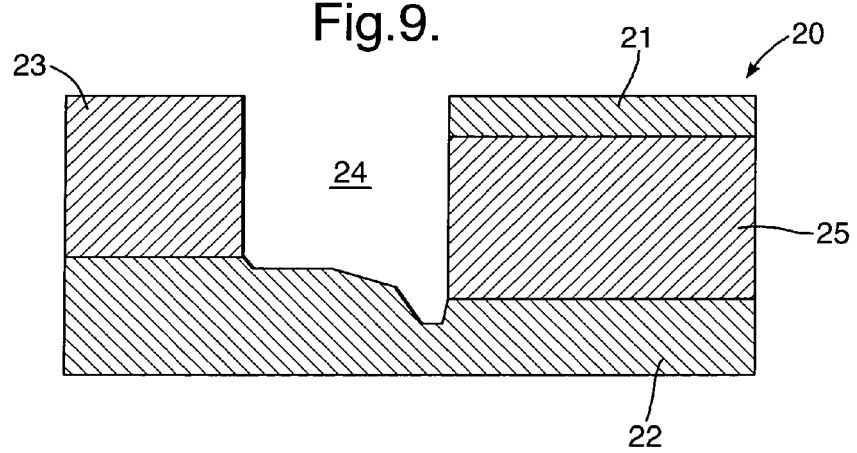
FIG. 9 is a schematic cross section of an alternative form of disc form for original creation of a groove in accordance with the present invention.

An alternative to the solid disc 1 depicted in FIG. 1 will be described later with respect to FIG. 9.

Figure 2:
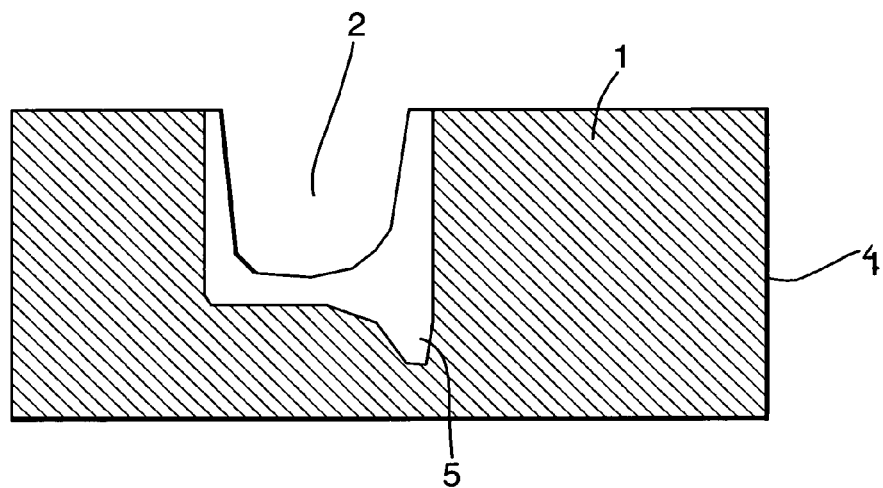
FIG. 2 is a schematic cross section of one side of the disc depicted in FIG. 1 encapsulated by a groove encapsulation member.

Once the disc 1 is appropriately formed as depicted in FIG. 1 with a groove 2, it will be understood that the groove is then encapsulated by a groove encapsulation form. This will generally take the form of a capsule 4 of mild steel used to encapsulate the groove 2 in order to define a cavity 5 as depicted in FIG. 2 with respect to one side of the disc ring depicted in FIG. 1. The capsule 4 encloses the whole of the disc 1 and enters the groove 2, but is spaced from the sides of the groove 2 to form the cavity 5. It may be possible to provide a capsule 4 which seals to the disc 1 on both sides of the groove 2 and enters the groove 2, but does not surround the whole of the disc 1.

Figure 3:
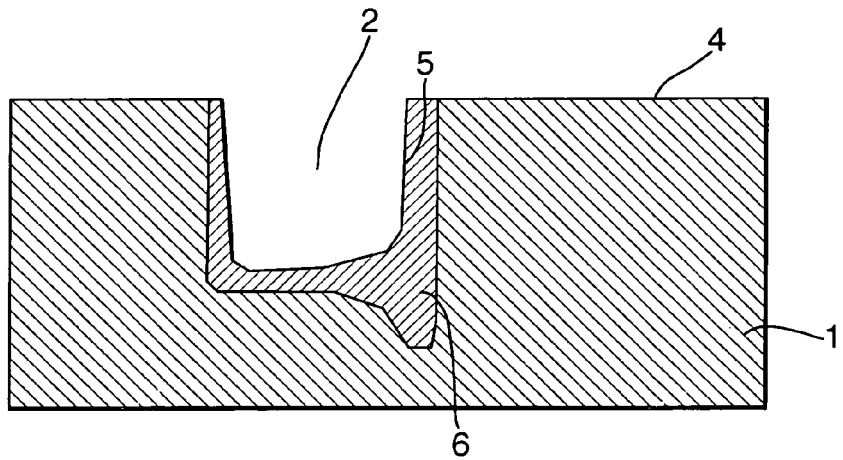
FIG. 3 is a schematic cross section of the disc side depicted in FIG. 2 filled with a titanium alloy powder.

As depicted in FIG. 3, the cavity 5 is filled with a titanium alloy powder 6. The capsule 4 about the groove 2 is then evacuated and off gassed at high temperature and then the powder 6 hot isostatically pressed (HIP) to densify and solidify the powder 6. In such circumstances the densified powder 6 creates a lining for the groove 2 formed initially as described above in the disc 1 by machining.

Figure 4:
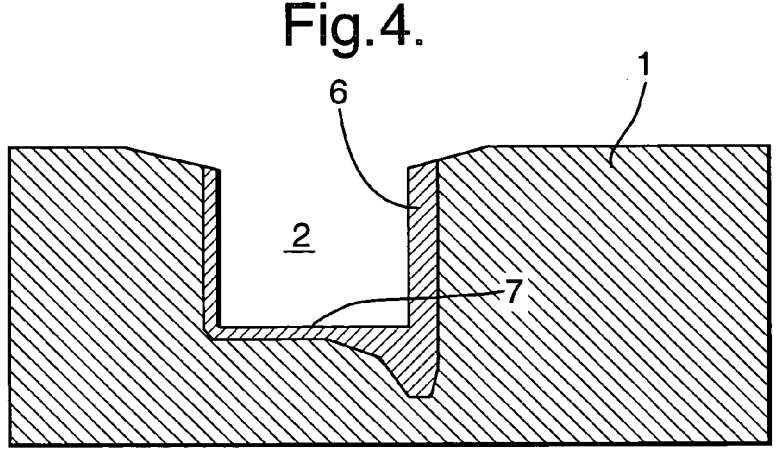
FIG. 4 is a schematic illustration of the disc side depicted in FIG. 3 wherein a groove insert form is precisely machined into a cavity insert form produced by densifying the titanium powder filling the groove.

In FIG. 4, the infill for cavity insert form created by the densified powder 6 is precisely machined in order to create a circumferential groove insert form 7 of precise dimensions and form.

Figure 5:
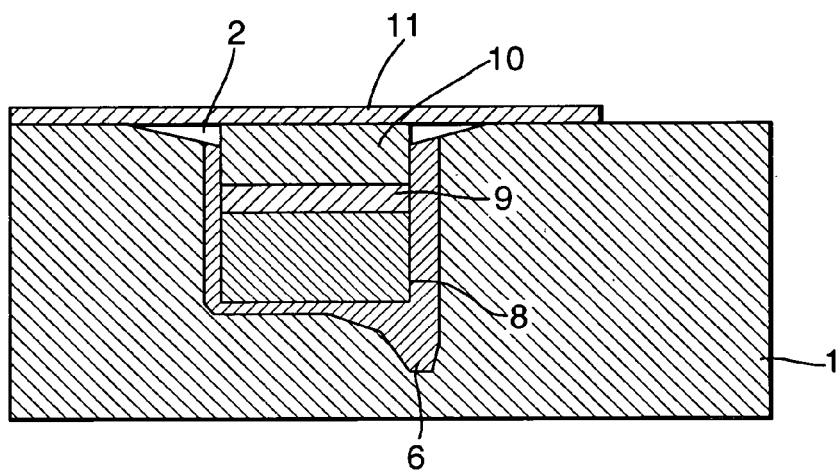
FIG. 5 illustrates the groove insert form depicted in FIG. 4 in which a pre densified ring of titanium alloy powder and titanium composite material are incorporated in the groove insert form with a lid and optional titanium metal ring.

In FIG. 5, the groove insert form 7 is filled with a pre form of unconsolidated titanium composite material 8 and a ring of pre densified titanium alloy powder 9. The unconsolidated titanium composite material 8 as indicated comprises unconsolidated titanium composite material consisting of at least one circumferentially extending ceramic fibre and titanium alloy wire or at least one circumferentially extending ceramic fibre and titanium alloy powder. Alternatively, at least one circumferentially extending ceramic fibre coated with titanium alloy. Further alternatively, a combination of at least one circumferentially extending ceramic fibre coated with titanium alloy and at least one circumferentially extending titanium alloy wire having a similar, or the same, composition to the titanium alloy coating on the at least one ceramic fibre will be incorporated or at least one circumferentially extending ceramic fibre coated with titanium alloy and a titanium alloy powder having a similar, or the same, composition to the titanium alloy coating on the last one ceramic fibre. The ring of pre densified titanium alloy powder 9 is placed as shown upon the pre forms 8. Optionally a further titanium packer ring 10 may be provided to ensure appropriate presentation of the pre densified titanium alloy powder 9 and pre form 8 as required. The groove 2 is again sealed with a lid 11 and the whole assembly evacuated and degassed. The assembly is then hot isostatically pressed (HIP) to produce a fully consolidated and unified structure comprising of a ring of composite material 15 embedded in titanium alloy powder, that is to say by the original powder 6 and the pre-densified powder 9. This unitary structure as depicted in FIG. 6 will form the mounting hoop for the component when finally formed.

Figure 6:
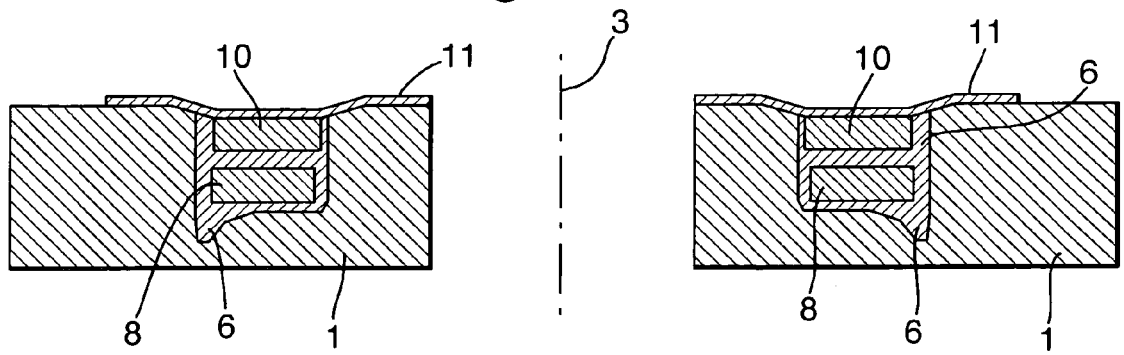
FIG. 6 is a cross section of a disc in which the groove insert form, pre densified ring of titanium alloy powder and titanium composite material depicted in FIG. 5 are consolidated.
Figure 7:
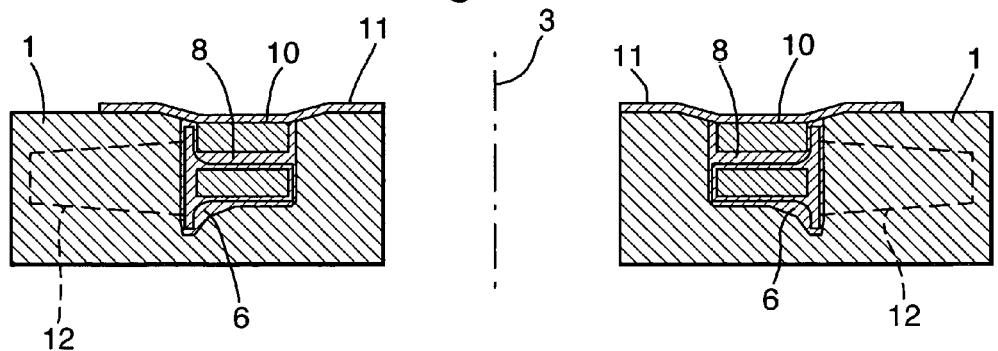
FIG. 7 is a schematic cross section of the disc depicted in FIG. 6 showing the relative position of the consolidated groove insert form, pre densified ring of titanium alloy powder and titanium composite material relative to the location of a finally formed component part of the disc.

FIG. 7 illustrates the next method stage beyond the unitary structure form depicted in FIG. 6. It will be appreciated that in this stage the final component elements will be formed. Thus, as illustrated by broken line 12, component elements will be machined from the disc 1 as required. This will be achieved by normal machining processes in order to leave the unitary structure with composite material embedded as required.

Figure 8:
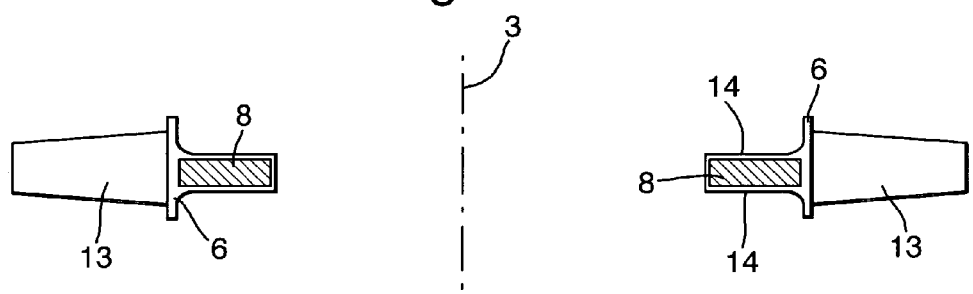
FIG. 8 is a schematic cross section of the disc depicted in FIG. 7 appropriately machined in order to create a final component form.

FIG. 8 illustrates the final composite form in which the finally machined components 13 extend from the unitary structure comprising the composite pre forms 8 embedded in the titanium powder now densified as required. In such circumstances, the surfaces 14 will generally be machined through a turning process in order to create the necessary mounting surfaces for a component disc.

As indicated above, generally the titanium component will be a gas turbine engine disc such that the formed elements 13 will be aerofoils. However, it will also be understood that as an alternative, retaining features such as circumferentially or axially extending slots may be machined into the structure instead of the aerofoils 13. These slots will then allow blades to be inserted into the disc to form a gas turbine rotor as required.

It will be understood by the present method it is not necessary to provide component grade material in the composite/densified titanium powder root for the final disc component. In short, by use of titanium alloy powder for embedding a composite pre form 8, it will be understood that significant costs savings are made.

It will be understood that essentially the original annular disc 1 with machined groove 2 provides the basis for material finely machined in order to achieve the components operational properties. In such circumstances the material from which the annular disc 1 is formed will generally be tailored for optimal component properties. Thus, when the component is a rotor disc, these tailored properties will be with respect to the blades formed in that disc subsequent to the present method.

The present method provides a means by which an optimally tailored material is associated conveniently with a pre form composite embedded in densified titanium alloyed powder. In such circumstances, as depicted in FIG. 9, a multiple layer annular disc 20 can be provided in which a central sandwich portion 25 has unclassified titanium rings 21, 22, 23 about it. In such circumstances, a groove 24 formed in the annular disc 20 can be utilised in accordance with the method described above, that is to say encapsulation to form a cavity, filling that cavity with titanium alloy powder, densifying that titanium alloy powder to create a groove insert form as a well to receive pre formed titanium composite inserts and a further layer of pre densified titanium powder such that the titanium composite insert pre form is embedded in the densified titanium alloy powder and then through subsequent machining operations, final component elements such as blades or mountings can be created associated with the densified titanium alloy powder embedding the titanium composite inserts. In such circumstances, lower grade, or as indicated unclassified titanium alloys may be used in the parts 21, 22, 23 which will essentially be machined away in order to create the final components in the sandwich layer 25 of material optimised for particular properties for the component, e.g. as rotor blades or mountings.

It will be understood that the present invention provides a means by which the titanium composite material is more securely retained during the processing steps than with previous methods, as generally three sides of the encapsulating densified titanium alloy powder are formed and then precision machined in order to create a groove insert form pocket for receipt of the pre formed titanium composite material. In that precision groove insert form the titanium composite pre forms are closely constrained, whilst the final encapsulating process occurs in the form of the pre densified ring of titanium alloy powder 6 being high temperature isostically pressed (HIP) to fully embed the titanium composite insert. In such circumstances, more accurate presentation and control of the position of the titanium composite insert is achieved to allow more close association and consistent positioning to the final form component elements.

Although only one embodiment of the present invention is described above, it will be appreciated for those skilled in the technology, that alternatives could be used. For example, although described with respect to a rotor disc, it will be understood that other component forms may be used and provided by the present method where it is necessary to more accurately position a pre formed insert in an embedded "potting" material for final association with a component form.

Although described with respect to titanium and titanium alloys, it will be understood that the method can also be used with regard to other metals and alloys.

The ceramic fibre may be silicon carbide or silicon nitride.

I claim:

1. A method of forming a metal component, the method comprising:

forming a metal pre form with a groove for consolidation of a potentially consolidatible composite material,
encapsulating the metal pre form with a groove encapsulating form to define a cavity between the metal pre form and the groove encapsulating form,
filling the cavity with a metal powder,
densifying the metal powder to replicate the cavity as a cavity insert form,
shaping the cavity insert form to a groove insert form,
filling the groove insert form with an unconsolidated composite material and metal powder, and
consolidating and densifying the metal powder and/or the unconsolidated composite material with the metal powder cavity insert form to form a unitary structure integral with the metal pre form and forming to a final component shape.

2. A method as claimed in claim 1 wherein the unconsolidated composite material and the metal powder are located within a circumferentially extending groove in the groove insert form.

3. A method as claimed in claim 1 wherein the metal pre form is machined from one side to form a circumferentially extending groove.

4. A method as claimed in claim 1 wherein the groove encapsulating form is placed so that it surrounds the metal pre form to define the cavity.

5. A method as claimed in claim 1 wherein the groove encapsulating form is a mild steel coat to the metal pre form about the groove.

6. A method as claimed in claim 1 wherein the metal powder in the cavity is densified to a solid state by hot isostatic pressing (HIP) of the metal powder after evacuation and off gassing at high temperature.

7. A method as claimed in claim 1 wherein the unconsolidated composite material is provided by locating at least one ceramic fibre and at least one alloy wire or alloy powder and/or at least one circumferentially extending ceramic fibre coated with an alloy or a combination of these parts.

8. A method as claimed in claim 1 wherein the unconsolidated composite material and the metal powder in the metal powder cavity insert form are densified and consolidated by hot isostatic pressing (HIP) after evacuation and degassing.

9. A method as claimed in claim 1 wherein the forming to final component shape forms elements of the final component and these elements extend from the metal pre form.

10. A method as claimed in claim 9 wherein the elements are aerofoils or coupling recesses or projections for securing other components.

11. A method as claimed in claim 1 wherein the composite material is a titanium composite material and the metal powder is a titanium alloy powder.

12. A method as claimed in claim 1 wherein the metal powder filling the cavity between the groove in the metal pre form and the groove encapsulating form and the metal powder filling the groove in the groove insert form are the same material and are different than the metal pre form.

13. A method as claimed in claim 1 wherein the metal pre form comprises a sandwich structure formed by metal alloys of differing types.

* * * * *